US012341671B2

(12) United States Patent
Gandhi et al.

(10) Patent No.: US 12,341,671 B2
(45) Date of Patent: Jun. 24, 2025

(54) GENERATING NETWORK FLOW PROFILES FOR COMPUTING ENTITIES

(71) Applicant: VMware LLC, Palo Alto, CA (US)

(72) Inventors: Rohan Gandhi, Pune (IN); AVinash Nigam, Guwahati (IN); Madan Singhal, Pune (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/335,658

(22) Filed: Jun. 15, 2023

(65) Prior Publication Data

US 2023/0327967 A1    Oct. 12, 2023

Related U.S. Application Data

(63) Continuation of application No. 17/452,936, filed on Oct. 29, 2021, now abandoned, which is a
(Continued)

(30) Foreign Application Priority Data

Nov. 11, 2020 (IN) .............................. 202041049307

(51) Int. Cl.
*H04L 43/20* (2022.01)
*H04L 43/026* (2022.01)
(Continued)

(52) U.S. Cl.
CPC .......... *H04L 43/065* (2013.01); *H04L 43/026* (2013.01); *H04L 43/04* (2013.01);
(Continued)

(58) Field of Classification Search
CPC ... H04L 47/122; H04L 47/125; H04L 47/129; H04L 67/148; H04L 67/1004;
(Continued)

(56) References Cited

U.S. PATENT DOCUMENTS 5,029,164 A  7/1991 Goldstein et al.
6,262,976 B1 7/2001 McNamara
(Continued)

OTHER PUBLICATIONS

Traffic-sensitive Live Migration of Virtual Machines (Year: 2017).*
(Continued)

*Primary Examiner* — Shirley X Zhang
(74) *Attorney, Agent, or Firm* — King Intellectual Asset Management

(57) ABSTRACT

A method for creating a flow profile is provided. The method identifies a first plurality of flow measurements, each of which corresponding to one of a plurality of flows exchanged between a computing entity and a service during a first time period. The method, for each of a first plurality of buckets each of which has a pair of lower and upper bounds, increments a counter of the corresponding bucket for each of the plurality of flow measurements that falls within the pair of bounds of that bucket. The method generates a second plurality of buckets by merging and splitting at least some of the first plurality of buckets, identifies a second plurality of flow measurements for the computing entity during a second time period, and distributes these measurements into the second plurality of buckets. The method generate the flow profile by aggregating the first and second pluralities of buckets.

20 Claims, 8 Drawing Sheets

Related U.S. Application Data continuation of application No. 17/172,101, filed on Feb. 10, 2021, now Pat. No. 11,165,676.

(51) Int. Cl.
*H04L 43/04* (2022.01)
*H04L 43/062* (2022.01)
*H04L 43/065* (2022.01)
*H04L 43/0876* (2022.01)

(52) U.S. Cl.
CPC ........ *H04L 43/062* (2013.01); *H04L 43/0876* (2013.01); *H04L 43/20* (2022.05)

(58) Field of Classification Search
CPC ............. H04L 67/1027; H04L 67/1029; H04L 67/1031; H04L 67/1036; H04L 43/065; H04L 43/026; H04L 43/04; H04L 43/062; H04L 43/0876; H04L 43/20
See application file for complete search history.

(56) References Cited

U.S. PATENT DOCUMENTS

| | | | |
|---|---|---|---|
| 7,161,902 B2 | 1/2007 | Carter et al. | |
| 9,866,441 B2 | 1/2018 | Day | |
| 10,320,681 B2 | 6/2019 | Hira et al. | |
| 10,447,544 B2 | 10/2019 | Day | |
| 11,036,538 B2* | 6/2021 | Lecuyer | H04L 12/4633 |
| 11,165,676 B1* | 11/2021 | Gandhi | H04L 43/04 |
| 11,533,265 B2* | 12/2022 | Gandhi | H04L 43/0829 |
| 11,711,307 B2* | 7/2023 | Pallagatti Kotrabasappa | H04L 47/2441 370/235 |
| 11,843,543 B2* | 12/2023 | Gandhi | H04L 47/22 |
| 12,170,622 B2* | 12/2024 | Pallagatti Kotrabasappa | H04L 45/08 |
| 2003/0069970 A1 | 4/2003 | Kim et al. | |
| 2003/0193893 A1 | 10/2003 | Wen et al. | |
| 2004/0064557 A1 | 4/2004 | Karnik et al. | |
| 2012/0075996 A1 | 3/2012 | Wan William Lau et al. | |
| 2012/0304175 A1* | 11/2012 | Damola | G06F 11/3419 718/1 |
| 2013/0215743 A1 | 8/2013 | Pannell | |
| 2014/0078903 A1* | 3/2014 | Edsall | H04L 47/30 370/252 |
| 2014/0108854 A1* | 4/2014 | Antony | G06F 11/2046 714/4.2 |
| 2015/0039764 A1* | 2/2015 | Beloglazov | H04L 67/52 709/226 |
| 2015/0055474 A1* | 2/2015 | Eyada | G06F 9/45558 370/235 |
| 2015/0138970 A1 | 5/2015 | Tabatabaee et al. | |
| 2015/0180780 A1 | 6/2015 | Froese et al. | |
| 2015/0281100 A1 | 10/2015 | Kurita | |
| 2016/0094450 A1 | 3/2016 | Ghanwani et al. | |
| 2016/0134161 A1 | 5/2016 | Hui et al. | |
| 2016/0164791 A1 | 6/2016 | Zahemszky et al. | |
| 2016/0188378 A1 | 6/2016 | Chao et al. | |
| 2017/0026283 A1 | 1/2017 | Williams et al. | |
| 2017/0295101 A1 | 10/2017 | Hira et al. | |
| 2018/0115472 A1 | 4/2018 | Chen et al. | |
| 2018/0316571 A1 | 11/2018 | Andrade et al. | |
| 2018/0349166 A1 | 12/2018 | Movsisyan et al. | |
| 2019/0288948 A1 | 9/2019 | Hira et al. | |
| 2020/0026538 A1 | 1/2020 | Cui et al. | |
| 2020/0106671 A1 | 4/2020 | Goel et al. | |
| 2020/0159726 A1 | 5/2020 | Miller et al. | |
| 2022/0141139 A1* | 5/2022 | Wong | H04L 41/5003 709/223 |

OTHER PUBLICATIONS

Virtual Machine Migration Planning in Software-Defined Networks (Year: 2019).*
Alizadeh, M. et al., "CONGA: Distributed Congestion-Aware Load Balancing for Datacenters," in SIGCOMM 2014.
Brakmo, L S_ et al., "TCP Vegas: End to End Congestion Avoidance on a Global Internet," IEEE J.Sel_ A. Commun., 2006.
"Broadcom buffer statistics tracking," https://people.ucsc.edu/_warner/Bufs/queue-monitor.html.
"Broadcom memory and bandwidth growth," https://www.linkedin.com/pulse/comparing-broadcom-silicons-used-datacenter-switches-reza-toghraee.
Cardwell, N. et al., "BBR: Congestion-Based Congestion Control," Queue, 2016.
Chekuri, C. et al., "On Multi-dimensional Packing Problems," in SODA, 1999.
Fall, K. et al., "Comparisons of Tahoe, Reno and Sack TCP," ACM SIGCOMM CCR, 1996.
Guo, C. et al., "SecondNet: A Data Center Network Virtualization Architecture with Bandwidth Guarantees," in ACM CoNEXT, 2010.
He, K. et al., "AC/DC TCP: Virtual Congestion Control Enforcement for Datacenter Networks," in ACM SIGCOMM, 2016.
Jacobson, V., "Congestion Avoidance and Control," ACM SIGCOMM CCR, 1988.
Jang, K. et al., "Silo: Predictable Message Latency in the Cloud," 2015.
Katta, N. et al., "CLOVE: How I Learned to Stop Worrying About the Core and Love the Edge," in ACM HotNets, 2016.
Kumar, A. et al., "BwE: Flexible, Hierarchical Bandwidth Allocation for WAN Distributed Computing," in ACM SIGCOMM, 2015.
Mitt Al, R et al., "TIMELY: RTT-based Congestion Control for the Datacenter," in ACM SIGCOMM, 2015.
Radhakrishnan, S. et al., "SENIC: Scalable NIC for End-Host Rate Limiting," in USENIX NSDI, 2014.
Roy, A. et al., "Inside the Social Network's {Datacenter) Network," in SIGCOMM, 2015.
Saeed, N. et al., "Carousel: Scalable Traffic Shaping at End Hosts," in ACM SIGCOMM, 2017.
Shieh, A. et al., "Sharing the Data Center Network." in Usenix NSDI, 2011.
"TCP Burst Attack," https://blog.radware.com/security/2018/02/burst-attack-protection/.
"TCP INCAST," https://www.pdl.cmu.edu/Incast/.
Zhang, Q. et al., "High-Resolution Measurement of Data Center Microbursts," in ACM IMC, 2017.
Zhu, Y. et al., "ECN or Delay: Lessons Learnt from Analysis of DCQCN and TIMELY," in ACM CoNEXT, 2016.

\* cited by examiner

Flow Sizes

| 12 | 10 | 1000 | 1400 | 2 |
|----|----|------|------|---|

0   100B   10KB   1MB   100MB   Inf.

Figure 3A

Packet Arrival Intervals

| 0 | 10 | 2983 | 9828 | 2 |
|---|----|------|------|---|

0usec   1usec   5usec   10usec   50usec   Inf.

Figure 3B

GENERATING NETWORK FLOW PROFILES FOR COMPUTING ENTITIES

RELATED APPLICATIONS

This continuation application claims benefit of and priority to U.S. application Ser. No. 17/452,936, filed Oct. 29, 2021, which claims benefit of priority to U.S. application Ser. No. 17/172,101, filed Feb. 10, 2021, which claims benefit under 35 U.S.C. 119(a)-(d) to Foreign Application Serial No. 202041049307 filed in India entitled "GENERATING NETWORK FLOW PROFILES FOR COMPUTING ENTITIES", on Nov. 11, 2020, by VMware, Inc., which are herein incorporated in their entirety by reference for all purposes.

BACKGROUND

Software defined networking (SDN) comprises a plurality of hosts in communication over a physical network infrastructure (e.g., in a datacenter), each host including one or more virtualized endpoints such as virtual machines (VMs), containers, or other types of virtual computing instances (VCIs) that are connected to logical overlay network(s) implemented by hypervisors of the hosts on the underlying physical network infrastructure. The rapid growth of network virtualization has led to an increase in large scale SDN datacenters. The scale of such datacenters may be very large, often including hundreds of servers with each server hosting hundreds of VCIs that are connected to each other via different forwarding elements (e.g., switches, routers, middle boxes, etc.). With such scale comes a need to be able to operate such network topologies efficiently and avoid flow congestions that may result in downtime. A flow may refer to a set of packets communicated between a source endpoint and a destination endpoint. For example, a five-tuple of a packet's source IP address, destination IP address, protocol, source port, and destination port may identify a traffic flow. Therefore, a set of packets having the same five-tuple may be part of the same flow. In certain aspects, a flow may refer to a Transport Control Protocol (TCP) flow or other Layer 4 (L4) flows.

Conventionally, a network stack implementing TCP running at the hosts, such as in the OS or hypervisor, has been widely used for communication between endpoints, such as VCIs. While TCP may be generally effective in reducing congestion in the network, such as by signaling packet drops, it may hurt network performance under some circumstances, such as when too many flows share the same link. For example, when several flows share the same link, TCP makes sure that each flow receives a fair share of the bandwidth of the link. For example, if 100 flows share a link that has 1 Gbps bandwidth, each of the 100 flows will receive 10 Mbps of the bandwidth. Therefore, a change in the network, such as a VCI migrating from one host to another, or adding a new VCI to a host, may cause additional network congestion at the hosts and significantly slow down performances of the applications that are running on the hosts.

For example, when a VCI migrates from one host to another, all the flows associated with the VCI may also move to the new host with the VCI. As such, the flows of the migrated VCI have to share the limited resources (e.g., CPU, memory, etc.) of the new host with flows of the existing VCIs of the host. As the number of flows increases on the new host, each flow receives a smaller portion of the bandwidth based on the fair sharing implementation of TCP, which can negatively affect the performance of applications running on the VCIs. As an example, when a domain name system (DNS) server is running on a VCI in a host and a bandwidth-heavy VCI is added to the same host, the allocated bandwidth to the DNS server may be substantially reduced causing high latency and packet drop for DNS requests. Having knowledge about the outbound and/or inbound flows of a VCI can help in avoiding network congestion.

SUMMARY

Herein described are one or more embodiments of a method for creating a flow profile for a computing entity communicating with a service. The method includes identifying a first plurality of flow measurement values, each of the first plurality of flow measurement values corresponding to one of a first plurality of flows exchanged between the computing entity and the service during a first time period. For each of a first plurality of buckets, each of which has a lower bound value and an upper bound value, the method increments a counter of the corresponding bucket for each of the first plurality of flow measurement values that is between the lower bound value and the upper bound value of the corresponding bucket, and generates a second plurality of buckets from the first plurality of buckets. The method generates the second plurality of buckets by (1) merging a first bucket and second bucket of the first plurality of buckets into a single bucket by (i) setting a lower bound value of the single bucket to the lower bound value of the first bucket and (ii) setting an upper bound value of the single bucket to the upper bound value of the second bucket, and (2) splitting a third bucket of the first plurality of buckets into a fourth bucket and a fifth bucket by (i) setting a lower bound value of the fourth bucket to the lower bound value of the third bucket, (ii) setting an upper bound value of the fourth bucket to a first value between the lower bound value and the upper bound value of the third bucket, (iii) setting a lower bound value of the fifth bucket to a second value between the lower bound value and the upper bound value of the third bucket, and (iv) setting an upper bound value of the fifth bucket to the upper bound value of the third bucket. Addition the method includes identifying a second plurality of flow measurement values, each of the second plurality of flow measurement values corresponding to one of a second plurality of flows exchanged between the computing entity and the service during a second time period. For each of the second plurality of buckets, the method increments a counter of the corresponding bucket for each of the second plurality of flow measurement values that is between the lower bound value and the upper bound value of the corresponding bucket. The method further includes generating the flow profile for the computing entity by aggregating the first plurality of buckets with the second plurality of buckets.

Also described herein are embodiments of a non-transitory computer readable medium comprising instructions to be executed in a computer system, wherein the instructions when executed in the computer system perform the method described above for creating a flow profile for a computing entity communicating with a service. For example, the instructions may include code or one or more instructions for performing each step of the method.

Also described herein are embodiments of a computer system, wherein software for the computer system is programmed to execute the method described above for creating a flow profile for a computing entity communicating with a service. For example, the computer system may include a processor coupled to a memory configured to perform each step of the method.

Also described herein are embodiments of a computer system comprising various means for executing the various steps of the method described above for creating a flow profile for a computing entity communicating with a service.

BRIEF DESCRIPTION OF THE DRAWINGS

FIGS. 3A-3B illustrate distribution of flow metrics received during a particular time period into multiple buckets, according to an example embodiment of the present application.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
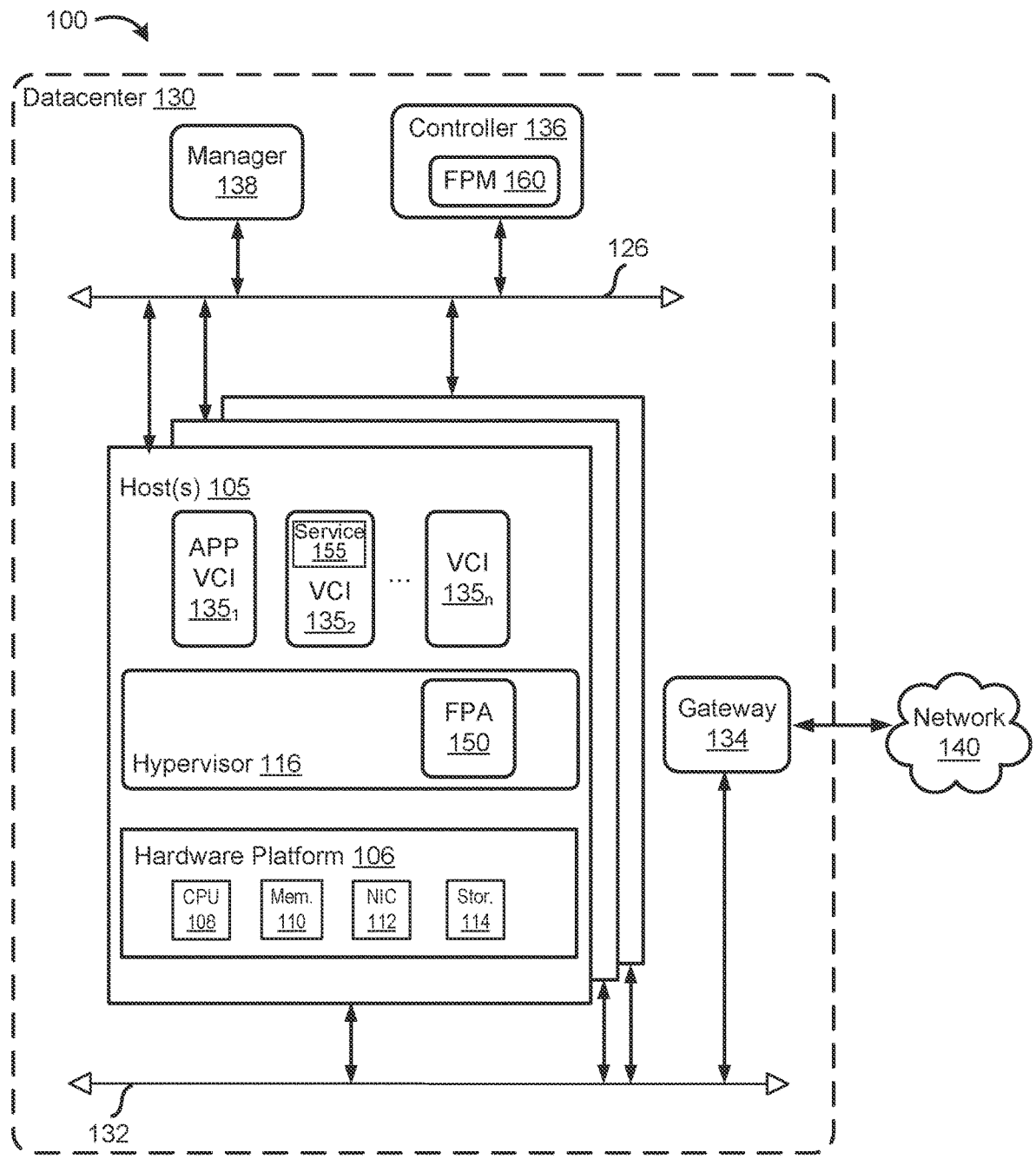
FIG. 1 is a block diagram illustrating a computer system in which one or more embodiments of the present disclosure may be utilized.

As described, because of Transport Control Protocol (TCP) characteristics, some network activities, such as adding a new VCI to a host may result in network congestion at the host. Additionally, TCP may not be efficient in resolving some network congestions, such as congestions caused by flow microbursts and/or when too many flows share the same link. Embodiments that provide efficient mechanisms for alleviating (or resolving) network congestions at different forwarding elements (e.g., physical and/or logical routers, switches, etc.) due to bursty flows, or too many flows sharing the same link, are described in commonly owned U.S. patent application Ser. No. 17/016,475, entitled "ALLEVIATING FLOW CONGESTION AT FORWARDING ELEMENTS," filed on Sep. 10, 2020, which is incorporated herein by reference in its entirety.

The embodiments described in U.S. patent application Ser. No. 17/016,475 provide a congestion alleviation manager that resides in a central management and control cluster of a datacenter and obtains data related to the flows and forwarding elements of the network. The aforementioned congestion alleviation manager may receive data related to the flows from the host machines and data related to the forwarding elements from the forwarding elements themselves. In certain embodiments, upon detection of a network congestion, based on the received data, the congestion alleviation manager may reduce the flow rates for bursty flows to alleviate or resolve the congestion. Additionally or alternatively, in some embodiments, upon detection of a network congestion, the congestion alleviation manager may move one or more flows from a congested link to alternative equal-cost path(s) that is experiencing less or no congestion. In some embodiments, the manager may migrate a subset of (bursty) flows first, as a fast reaction to the congestion detection, and may subsequently, as a slower reaction, reduce the flow rates of the remaining bursty flows, for example, by using rate limiters.

The above mentioned embodiments, however, do not generate flow profiles that are specific to one or more VCIs. This may be particularly important during migration or addition of a VCI to a host machine. For example, a VCI with too many flows, or a VCI that has one or more bursty flows, should not be added to a host machine that is already suffering from network congestion due to, for example, having one or more congested forwarding elements.

In some of the present embodiments, a flow profile (FP) agent residing in the hypervisor of the host machines may collect flow information received from a computing entity running on one or more host machines to generate a flow profile for the computing entity. A computing entity, in some embodiments, may include an individual VCI, a group of VCIs, or any network entity that has a network internet protocol (IP) address assigned to it. A group of VCIs may include one or more VCIs that are associated with a tier (e.g., an application tier, a web tier, a database tier, etc.) of a multi-tier network architecture. In certain embodiments, a computing entity may also include an application that runs in a VCI.

The flow information that is gathered by an FP agent may include information associated with the flows that are exchanged between a computing entity and a destination, such as a web service, a database running on one or more VCIs, a DNS service, or any other service that is associated with an IP address and a port number. Collecting flow details that are exchanged between a computing entity and a service is particularly important since network communication with a service often last for long durations (e.g., ranging from a few hours to even days). For example, even when a VCI is migrated to a different host machine, services with which the VCI is in communication often remain the same. Additionally, the flow information associated with such communications are often steady and do not fluctuate, which makes the information more useful for creating a profile.

In some embodiments, the FP agents of the host machines may be in communication with a central FP manager residing, for example, in the central management and control cluster of a datacenter and may transmit the flow data gathered at each host machine to the FP manager. The FP manager may use the received data to generate and maintain flow profiles for different computing entities that run in the datacenter. In certain embodiments, each FP agent running on a host machine may generate a flow profile for the VCIs that run on that host machine and report the generated flow profiles to the FP manager. In some such embodiments, the FP manager may decide to which host machines to add the VCIs based on the received flow profile information and/or inform the other host machines of the flow profiles of the VCIs when the VCIs are migrated, or added, to those host machines. The FP manager may be the same flow congestion manager that is described in the above mentioned U.S. patent application Ser. No. 17/016,475, or may be a separate entity in some embodiments.

A flow profile for a computing entity may include flow information associated with a computing entity, such as the flow sizes (e.g., in bytes), flow arrival rates, number of flows, flow burst sizes, packet arrival intervals in the flows, packet sizes in the flows, nature of the flows (bandwidth sensitive versus latency sensitive), or any other flow related characteristics. A flow size, in some embodiments, may be described as the number of bytes transferred from a source endpoint to a destination endpoint and received back from the destination endpoint in an individual flow, such as since the creation of the flow. For example, 20K bytes may be transferred from the source endpoint to the destination endpoint and 40K bytes may be received back from the destination endpoint by the source endpoint in an individual flow. A flow arrival rate may be described as an average rate at which new flows are created within a particular amount of time (e.g., a number of seconds). For example, 30 new flows may be created in a second. Each new flow may be identified using synchronization (SYN-) packets. The number of concurrent flows may be described as the number of active flows on a single host, such as at a given time. An active flow may be defined as a flow through which data transfer is still possible. Specifically, an active flow is a flow that has been initiated (e.g., using SYN-packets), but has not finished (using FIN-packets) yet. The number of concurrent flows may include all such active flows at a particular time instance. For example, at certain point of time, there might be 10K concurrent flows on a single host. For a flow burst sizes, since a source endpoint may send the packets in a burst using TCP protocol, there may be several packets that are sent within a short time interval (e.g., a number of ms, a number of seconds, etc.) which have not been acknowledged by the destination endpoint yet. Such packets in a flow may be indicative of the flow burst size. For example, 10 packets sent in a burst (e.g., a number of seconds) may be indicative of the flow burst size. Packet arrival intervals in a flow may specify the time intervals between consecutive batches of packets. In other words, a packet arrival rate for a flow may be the same as the round-trip-time (RTT). For example, packet arrival interval or RTT may be 40 millisecond between source and destination endpoints. Packet sizes in a flow may specify different packet sizes in an individual flow. For example, a flow may include 60% packets of 64 Bytes and 40% packets of 1460 Bytes. Nature of the flows (e.g., bandwidth sensitive versus latency sensitive) may classify the flows based on the type of an application that initiates the flows. For example, an application that is used in real-time chat systems may be latency sensitive. As such, all the flows of such an application may be tagged as latency sensitive. Conversely, if an application is batch processing (e.g., which is a bandwidth sensitive type of event), then all of its flows may be labelled as bandwidth sensitive.

In some embodiments, an FP agent may capture flow data that is specific to a computing entity, such as size or burstiness of the flows generated by the computing entity, instead of, for example, capturing flow details that are impacted by the network, such as the flow rates, flow round trip times (RTTs), etc. In particular, the application specific details often remain unchanged even if the network environment for a computing entity changes, whereas the flow details impacted by the network may change upon a change in the network environment. For example, before a VCI migrates from one host machine to another, the traffic transmitted, or received, by the VCI may be routed through one or more congested links, which may result in slower rates for the flows of the VCI. After the VCI's migration, however, its traffic may be routed through one or more links that are not experiencing any congestion, which may result in much faster flow rates for the VCI. As such, the details of the flow that are influenced by the network may change substantially as the VCIs move in the network.

Additionally, the FP agent, in some embodiments, may collect the flow information associated with a computing entity for a relatively recent period of time at different time intervals to render the most recent information in a flow profile generated for the computing entity. For example, the FP agent may collect flow information for the last 60 minutes, 90 minutes, etc., every 10 minutes, 15 minutes, etc. It should be noted that the time intervals may have continuity between them, such that each time interval may immediately follow a previous time interval in some embodiments, or, in some other embodiments, the time intervals may be discontinuous, such that there may be time gaps between measurements time intervals. The FP agent or the central FP manager of some embodiments may iteratively (i) receive the flow data associated with a computing entity, (ii) distribute the received data into a set of multiple buckets with each bucket keeping a count for a range of measurement values, and (iii) dynamically merge and divide the buckets based on the counts they hold to create a new set of buckets for distributing the next set of received flow related data during the next time interval. The FP agent may then aggregate the sets of buckets together in order to generate a flow profile for the computing entity. More details about storing the buckets on a rolling basis in multiple snapshots over a time period and dynamically merging-and-dividing the buckets in each snapshot to create the buckets of the next snapshot are described below with reference to FIGS. 1-8.

FIG. 1 is a block diagram illustrating a computer system 100 in which one or more embodiments of the present disclosure may be utilized. Computer system 100 may include a datacenter 130 and a network 140. Network 140 may be, for example, a direct link, a local area network (LAN), a wide area network (WAN), such as the Internet, another type of network, or a combination of some or all of these networks.

Datacenter 130 may include host(s) 105, a gateway 134, a management network 126, and a data network 132. Datacenter 130 may also include a controller 136 and a manager 138 connected to management network 126. Controller 136 may be a computer program that resides and executes in a central server in datacenter 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 may be associated with one or more virtual and/or physical CPUs (not shown). Processor(s) resources allotted or assigned to controller 136 may be unique to controller 136, or may be shared with other components of datacenter 130. Controller 136 may communicate with hosts 105 via management network 126.

Manager 138 generally represents a management plane comprising one or more computing devices responsible for receiving logical network configuration inputs, such as from a network administrator, defining one or more endpoints (e.g., VCIs) and the connections between the endpoints, as well as rules governing communications between various endpoints. For example, manager 138 may receive network configuration (e.g., and other security policies) from a network administrator, generate network configuration data for different network entities, and send the network configuration data to controller 136 for distribution to endpoints on hosts 105 (e.g., via management network 126).

Controller 136 and manager 138 may be integrated into a single appliance, be distributed across hosts 105, or be part of a centralized management and control system (not shown in the figure) that includes one or more controllers and managers. The centralized management and control system may carry out administrative tasks for datacenter 130. The administrative tasks may include, but are not limited to, managing hosts 105, managing workload VCIs 135 (e.g., VMs, containers, etc.) running within each host 105, defining network topologies, provisioning VCIs, migrating VCIs from one host to another host, load balancing between hosts 105, etc.

The centralized management and control system may also create and maintain one or more logical network overlays implemented (e.g., by the hypervisors 116 of the host machines) on the underlay physical network (e.g., data network 132). Both management network 126 and data network 132, as well as the overlay logical networks may include multiple forwarding elements (e.g., routers, switches, middle boxes, etc.) that are connected to each other to create different network paths carrying different flows of the network. The different flows may include, but are not limited to, data flows exchanged between the hosts of datacenter 130, data flows exchanged between the hosts of datacenter 130 and other computing systems, such as hosts of other datacenters (e.g., through network 140), management and control flows exchanged between the hosts of datacenter 130 and centralized management and control system of datacenter 130, etc.

An example type of data flow is a flow exchanged between a computing entity and a service. As described above, a computing entity may include an individual VCI, such as APP VCI 135$_1$, or a group of VCIs including the APP VCI 135$_1$. For example, APP VCI 135$_1$ may be part of a group of VCIs 135 that implement a particular application. VCI 135$_1$ may be in communication with a service, such as a service 155 running in VCI 135$_2$, or implemented by a group of VCIs 135 including VCI 135$_2$. Service 155 may include a web server, a database server, a DNS server, or any other service.

As described above, having a flow profile for the flows communicated between VCI 135$_1$ and service 155 executed in VCI 135$_2$ may be helpful in different scenarios, such as when VCI 135$_1$ is migrated from one host 105 to another, or when a new VCI associated with VCI 135$_1$ is added to a host 105. For example, since VCIs that implement an application behave substantially in the same manner, knowing the flow profile of one of the VCIs associated with the application, such as VCI 135$_1$, may help in determining to which host additional VCIs that implement the same application can be added. Additionally, generating one flow profile for only one of a group of VCIs that implement an application may be enough to determine/estimate the flow profile for other VCIs in the group since network activities of the VCIs that are implementing the same application or database may be similar. Therefore, all of the VCIs of the group may share the same profile that is generated for one of the VCIs. Another benefit of having a flow profile assigned to a VCI may include using any observed deviations from a typical flow profile of the VCI as evidence of aberrant behavior that may be indicative of a potential security threat to the network. Additionally, flow profiles may also be useful in predicting the impact of changes to a network topology prior to making changes to the network.

To determine a flow profile for VCI 135$_1$, a flow profile (FP) agent, such as FPA 150 that resides in hypervisor 116 of host 105 may collect the flow information for the flows that are exchanged between VCI 135$_1$ and service 155. For example, the information related to all packets that are initiated by VCI 135$_1$ (e.g., having the same source IP address as the IP address assigned to VCI 135$_1$) and destined for service 155 (e.g., having the same destination IP address and port number that are assigned to service 155) may be collected by FPA 150. The collected information may be separated by the flows to which each packet belongs (e.g., packets that share the same five-tuple belong to the same flow). As described above, the collected information for the flows may include, but is not limited to, flow sizes (e.g., total packet sizes in each flow), flow arrival rates, number of flows, flow burst sizes, packet arrival intervals in the flows, packet sizes in the flows, etc.

It should be noted that even though the flows exchanged between a computing entity and a service in FIG. 1 and other Figures may have been shown to be between a VCI and a service running in another VCI, as described above, the collected flows for calculating a flow profile may be between a first application running in a first VCI and a second application running in a second VCI, between several first VCIs and a second VCI, between several first VCIs and several second VCIs, etc.

In some embodiments, FPA 150 may use the collected information to generate a flow profile for VCI 135$_1$, or may send the collected information to an FP manager, such as FPM 160 that resides in the centralized management and control system, for example, in controller 136, to calculate the flow profile for VCI 135$_1$. Although shown in the controller 136, FPM 160 may reside in a manger, such as manager 138 in some embodiments. In some embodiments, FPM 160 may receive the calculated flow profiles from the FPA 150 and use them for decision making related to VCI migration and/or addition. FPA 150 or FPM 160 may also use the flow profile information for other events related to VCIs, such as, for example, when a flow profile of a VCI indicates that the VCI is generating bursty flows, the FPA or FPM may signal another module or agent of the host machine that is hosting the VCI to rate limit the flows transmitted from the VCI.

FP agent 150 may collect the flow information associated with VCI 135$_1$ at different time intervals and may generate a flow profile for VCI 135$_1$ periodically or upon occurrence of a certain event (e.g., when VCI 135$_1$ is migrated to another host machine). FP agent 150 or FP manager 160 of some embodiments may iteratively (i) receive flow measurement values (e.g., number of the flows) associated with VCI 135$_1$, during each time interval (ii) distribute the measurement values into a set of buckets with each bucket keeping a count for a range of measurement values, and (iii) dynamically merge and divide the buckets based on the counts they hold to create a new set of buckets for distributing the next set of received measurement values during the next time interval. FP agent 150 may then aggregate the last N sets of buckets (N being a positive integer) together in order to generate a flow profile for VCI 135$_1$. More details about calculating a flow profile for a computing entity is described in the following paragraphs.

Datacenter 130 may include additional components (e.g., a distributed data storage, etc.) that are not shown in the figure. Management network 126 and data network 132, in one embodiment, may each provide Layer 2 or Layer 3 connectivity in accordance with the Open Systems Interconnection (OSI) model, with internal physical or software defined switches and routers not being shown. Although the management and data network are shown as separate physical networks, it is also possible in some implementations to logically isolate the management network from the data network (e.g., by using different VLAN identifiers) in a shared physical network.

Each of hosts 105 may be constructed on a server grade hardware platform 106, such as an x86 architecture platform. For example, hosts 105 may be geographically co-located servers on the same rack or on different racks. Hardware platform 106 of each host 105 may include components of a computing device, such as one or more central processing units (CPUs) 108, system memory 110, a network interface 112, storage system 114, and other I/O devices, such as, for example, USB interfaces (not shown). Network interface 112 enables each host 105 to communicate with other devices via a communication medium, such as data network 132 or management network 126. Network interface 112 may include one or more network ports, which may be implemented by network devices that may be referred to as network adapters or network interface cards (NICs). In certain embodiments, data network 132 and management network 126 may be different physical networks as shown, and the hosts 105 may be connected to each of the data network 132 and management network 126 via separate NICs or separate ports on the same NIC.

Host 105 may be configured to provide a virtualization layer, also referred to as a hypervisor 116, that abstracts processor, memory, storage, and networking resources of hardware platform 106 into multiple workload virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, Docker containers, data compute nodes, isolated user space instances, namespace containers, and/or the like. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines.

In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Though certain aspects may be described with respect to a VM, they may similarly be applicable to other VCIs and/or physical endpoints.

Although hosts 105 are shown as including a hypervisor 116 and virtual computing instances 135, in an embodiment, hosts 105 may include a standard operating system instead of a hypervisor 116, and hosts 105 may not include VCIs 135.

Gateway 134 provides hosts 105, VCIs 135, and other components in datacenter 130 with connectivity to one or more networks, such as network 140, used to communicate with one or more remote datacenters or other entities.

Gateway 134 may manage external public Internet Protocol (IP) addresses for VCIs 135 and route traffic incoming to and outgoing from datacenter 130 and provide networking services, such as firewalls, network address translation (NAT), dynamic host configuration protocol (DHCP), and load balancing. Gateway 134 may use data network 132 to transmit data network packets to hosts 105. Gateway 134 may be a virtual appliance, a physical device, or a software module running within host 105.

Figure 2:
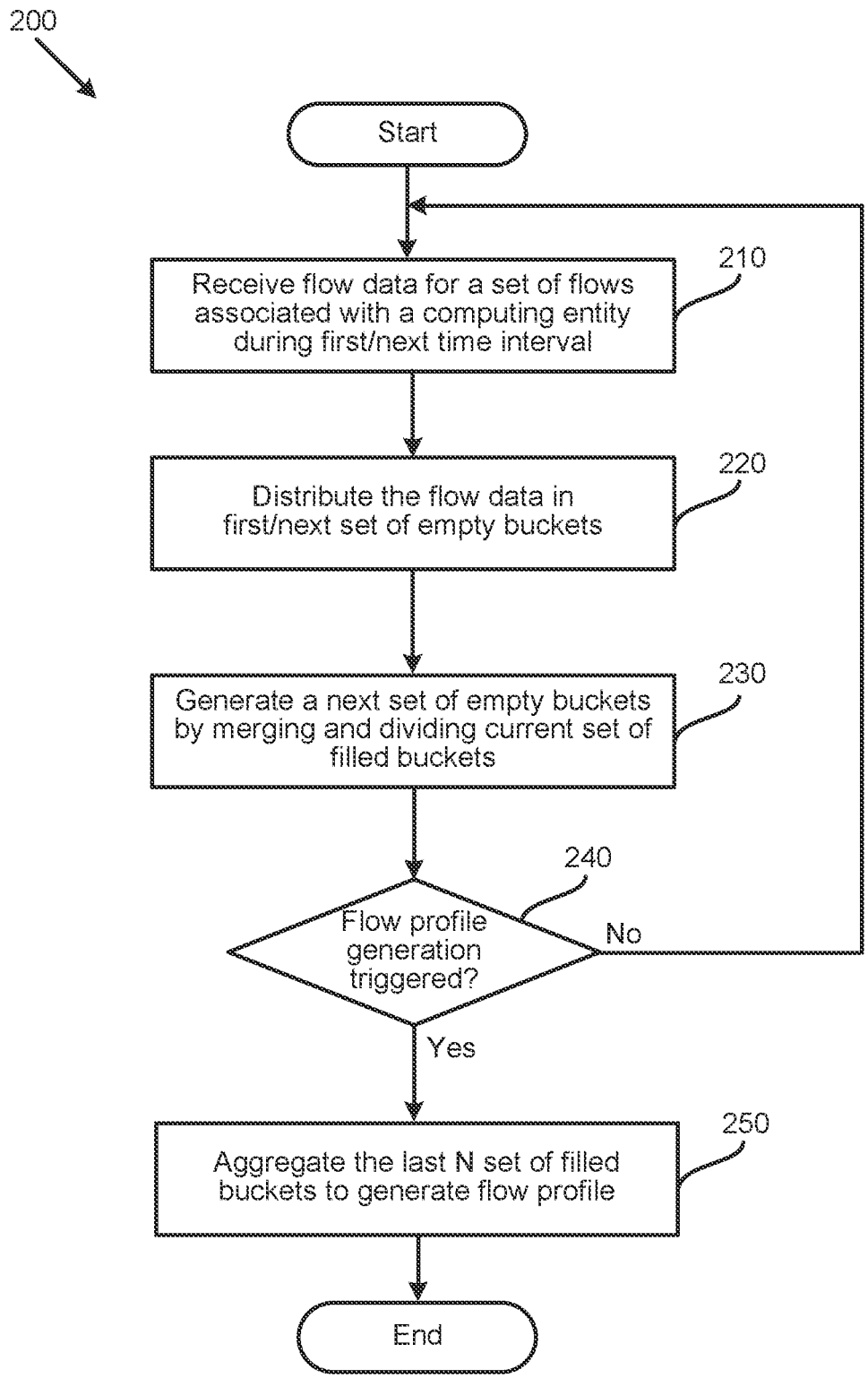
FIG. 2 is a flowchart illustrating a process/method for determining a flow profile for a computing entity, according to an example embodiment of the present application.

FIG. 2 is a flowchart illustrating a process/method 200 for determining a flow profile for a computing entity, according to an example embodiment of the present application. Process 200 may be performed, for example, by an FP agent, such as FPA 150, an FP manager, such as FPM 160, as described above with reference to FIG. 1, or a combination of the FP agent and FP manager. Process 200 may begin, at 210, by receiving flow data for a set of flows exchanged between the computing entity and a service during a time period. When operation 210 is performed for the first time, the time period/interval during which the flow data is received is a first time period/interval. For each next iteration though, the time period during which the flow data is received in operation a corresponding subsequent time period/interval.

Capturing flow data for all the flows of a computing entity, such as a VCI, may result in a high memory overhead. For example, a typical VCI that communicates with several services in the same datacenter during the same time, may render thousands of flows during a short period of time (e.g., one hour) for each service. To capture actual values for multiple different metrics, such as flow sizes, number of flows, burst sizes, packet arrival rates, etc., for each flow the system may require a vast amount of memory. As an example, when capturing packet arrival intervals for all the flows between a VCI and a single service, packets in each flow may not arrive at the same time, nor may they follow a uniform distribution. Accordingly, there could be one hundred different values for packet arrival intervals conservatively speaking. Even with a conservative estimate of one hundred different values, at least 800 bytes may be needed for each flow only to store the packet arrival intervals. Consequently, 800 MB (e.g., 800 bytes×10K flows×100 services) of memory may be needed for each VCI. Assuming that a single host machine may host at least 50 VCIs, 40 GB of memory may be needed for storing the flow information. This is a significant overhead and may only grow as a VCI communicates with more services or communicates more flows per service. Embodiments of the present disclosure may reduce the memory required for flow profiles significantly, as described below.

Instead of storing each individual flow metric value, the FP agent (or manager) of some embodiments may store the flow information (or metrics) in a distributed fashion as a set of ranges, for example, as a histogram. To do so, the FP agent of some embodiments may determine different ranges of flow metric values and assign each range to a bucket. The FP agent may then track how many flow metric values fall within each range, and sets the value of the corresponding bucket accordingly.

FIGS. 3A-3B illustrate distribution of flow metrics received during a particular time period into multiple buckets, according to an example embodiment of the present application. As shown in FIGS. 3A and 3B, each bucket has a lower bound value and an upper bound value and stores a counter. The counter may indicate the number of flow metric values that fall within the lower bound and upper bound values of that bucket. For example, FIG. 3A shows the buckets for flow sizes as a set of five different buckets. More specifically, there are 12 flows with flow sizes between 0-100 bytes, which are placed in the first bucket having the same pair of boundaries (e.g., a lower bound of 0 and an upper bound of 100 bytes). Similarly, there are 10, 1000, 1500 and 2 flows having, respectively, sizes between 100B-10K bytes, 10K-1 M bytes, 1 M-100 M bytes, and 100 M-infinite bytes placed in their respective buckets. Similarly, FIG. 3B illustrates the buckets and counters for distribution of packet arrival intervals. As shown, there are 0, 10, 2983, 9828, and 2 flows having, respectively, packet arrival rates between 0-1 microseconds (usec), 1-5 usec, 5-10 usec, and 10-infinite usec placed in their respective buckets.

Storing the histogram of flow metrics using the above described distribution method may reduce the memory overhead while still addressing the use cases effectively. For example, assuming that each bucket stores a 4-byte counter, using 10 buckets for a histogram may result in requiring only 40 bytes of memory to store each flow metric. If 5 different metrics for each flow profile are stored, only 200 bytes of memory is needed. Therefore, if a VCI communicates with 100 different services (as discussed in the same example above), only 20 KB of memory per VCI is needed. This is a significant reduction (e.g., a factor of 50000) from 800 MB required for storing individual metrics, as described above. Cumulatively, across 50 VCIs running on a host machine, only 1 MB of memory is needed in the host machine to store flow profiles for the VCIs where the FP agent may keep five different types of flow metric for each flow.

Returning to FIG. 2, at 220, process 200 may distribute the flow data received in operation 210 in a set of buckets. The set of buckets may be a first set of buckets when operation 220 is performed for the first time, or may be the next set of buckets in the next iterations of operation 220. For the first set of buckets, process 200 may distribute the flow metrics received during the first time interval into the buckets by determining within which bucket the flow metric belongs based on the flow metric value falling within the boundary range of the bucket, and then adding one to the counter of the bucket. After the distribution of flow metrics into the first set of buckets, process 200 may generate a next set of buckets from the first set of buckets using a merge-and-divide approach. For example, as described in greater detail below, with reference to FIGS. 4-6, process 200 may merge two adjacent buckets that have the lowest sum of counter values (e.g., the first and second buckets shown in FIG. 3A having, respectively, boundaries between 0-100B and 100B-10 KB) and, at the same time, split a bucket that has the highest counter value (e.g., the fourth bucket shown in FIG. 3A with boundaries between 1 MB-100 MB). As a result, the number of buckets in the first set of buckets (generated for the first interval) and the next set of buckets (generated for the second/next interval) may stay the same, though the boundary ranges may change.

The flow metric values of flows may vary over a large range. To be able to capture all the flow metric values, in some embodiments, the lowest bound of the first bucket may be set to 0 and the highest bound of the last bucket may be set to infinity. Some embodiments may set the bounds for the rest of the buckets that fall between the first bucket and the last bucket in geometric progression to cover the diverse values with a limited number of buckets. For example, as shown in FIG. 3A, the boundaries of 0B, 100B, 10 KB and so forth are set for the flow sizes. However, the values for the individual flow metrics may not be evenly distributed between the buckets, and therefore having more granular information for certain ranges of values may not be as useful. As such, to increase the effectiveness of the buckets, some embodiments may dynamically change the bounds of the buckets and expand the buckets with larger count values, as described with reference to operation 230 of Figure.

At 240, process 200 may determine whether a flow profile generation for the computing entity is triggered or not. As described above, a triggering event may be when a flow profile for the computing entity is needed (e.g., when a VCI is migrated to a new host). In some embodiments, the flow profile may be generated periodically. For example, the triggering event may be after passage of a certain number of time intervals (e.g., after 6 time intervals, such as 10 minutes, have passed). This way, for example, every one hour a flow profile generation is triggered. If process 200 determines that a flow profile generation is triggered, the process aggregates, at 250, the last N set of filled buckets (e.g., the last N snapshots of flow metrics) to generate the flow profile for the computing entity, N being a positive integer. For example, if N is defined as 6 and time intervals are defined as every 10 minutes, then process 200 may generate the profile every hour by aggregating the last 6 snapshots. Process 200 may then end. On the other hand, if process 200 determines that a triggering event has not occurred yet, the process may return to 210 to continue receiving flow metric values for the next time interval.

In some embodiments, if the FP agent is triggered to generate a flow profile, for example, by receiving a signal indicating that a VCI has to be moved to a different host, and at the same time a complete cycle for generating a flow profile for the VCI has not been reached yet (e.g., only three snapshots out of six snapshots are generated), the FP agent may use the last N snapshots (N being a predefined positive integer) and aggregate them to generate a new flow profile (e.g., instead of using an already generated flow profile that is not the most recent). Aggregating flow snapshots to create a flow profile is described in more detail in the following paragraphs.

As described above, one of the flow metrics calculated and saved in a flow profile of a computing entity is the burst sizes of the flows generated by the computing entity. Some embodiments may calculate the burst size of a flow by sending the flow through a flow rate manager, such as a rate limiter residing in the hypervisor of a host machine and monitoring the queue size of the rate limiter. In some embodiments the limit for the rate limiter may be set to the peak size (e.g., 10 Gbps) of a virtual or a physical network interface card/controller (NIC).

Figure 4A:
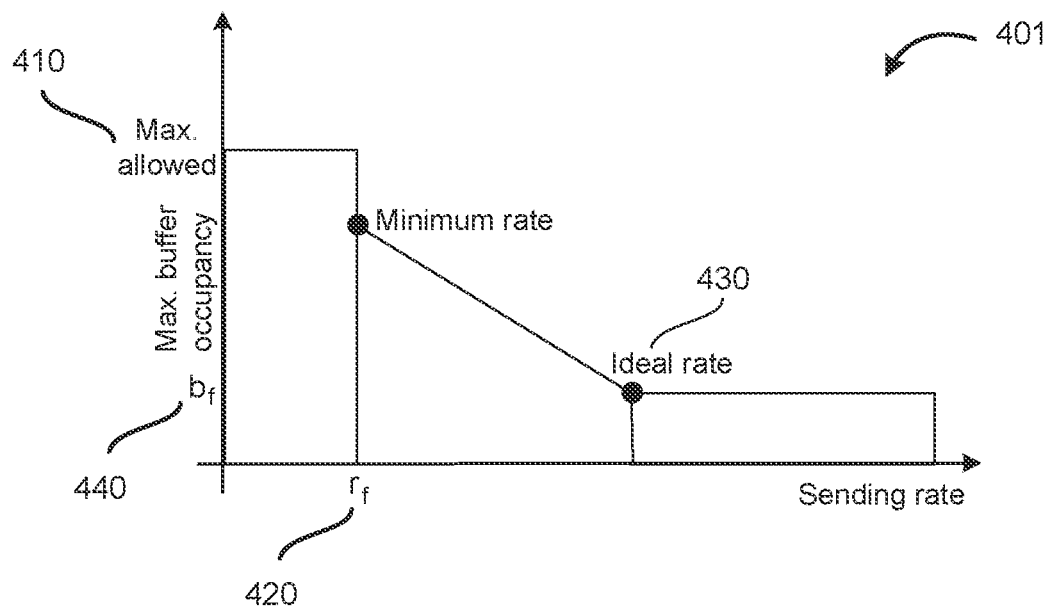
FIGS. 4A-4B include two different graphs used for the calculation of burst size for a flow, according to an example embodiment of the present application.
Figure 4B:
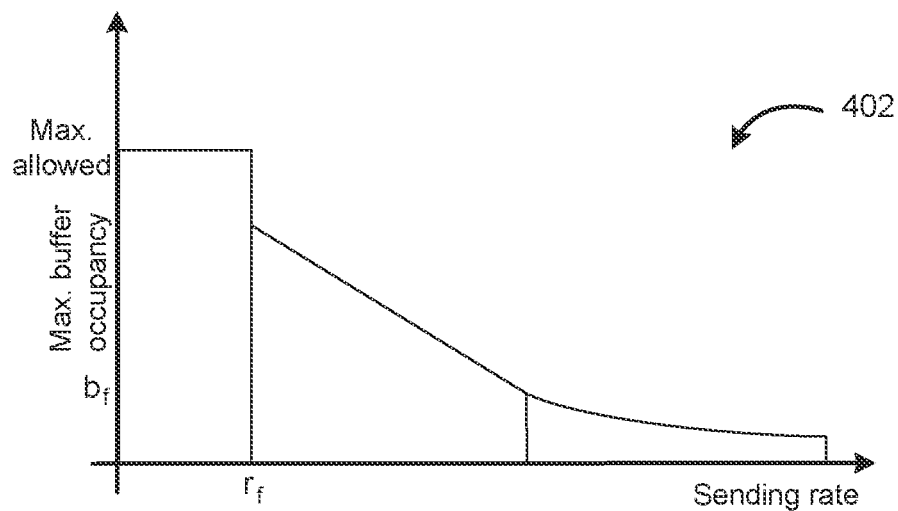

FIGS. 4A and 4B include two different graphs 401 and 402 used for calculation of the burst size of a flow, according to an example embodiment of the present application. Graph 401 shows maximum buffer occupancy (e.g., of a flow rate manager (FRM) or rate limiter) as a function of the sending rate of a flow. In particular, graph 401 represents a theoretical graph modeling the maximum occupancy level that a buffer of the FRM would achieve as packets of a particular flow are received by the FRM, and buffered in the buffer by the FRM until the packets are sent by the FRM. As shown in graph 401, the maximum occupancy level for the buffer is shown for different sending rates used by the FRM for sending the received packets of the flow. For example, a bursty flow may be passed through the FRM. If, as shown, the sending rate is 0, the FRM is not sending any packets of the flow that are received and therefore maintains all the packets in the buffer and the packets do not leave the buffer as they are not sent. Therefore, as shown, the buffer of the FRM will reach its maximum allowed buffer occupancy 410

(e.g., the overall size of the buffer) and then subsequent packets of the flow received at the FRM will be dropped.

Further, as the sending rate is increased, if the sending rate is less than the rate at which packets are received for the flow by the FRM, then the buffer of the FRM will still reach its maximum allowed buffer occupancy 410 as packets are received at the FRM faster than they are sent, meaning the buffer builds and overruns. A minimum sending rate 420 (rf) for the flow is shown, which is the lowest sending rate at which the buffer of the FRM no longer reaches its maximum allowed buffer occupancy 410 and, at the same time, no packet is dropped. The minimum sending rate 420 may be equal to, for example, the average rate at which the packets of the flow are received by the FRM. In particular, if the sending rate of packets equals the receive rate, then the buffer may not overrun as packets are not received faster than they are sent.

Continuing, as shown, as the sending rate is increased from the minimum sending rate 420, the maximum buffer occupancy of the buffer of the FRM decreases until an ideal sending rate 430 is reached (e.g., at maximum buffer occupancy 440). In particular, between the minimum sending rate 420 and the ideal sending rate 430, as the sending rate is increased, the ratio of packet sent rate to packet received rate increases, thereby requiring less buffer occupancy to store received packets until they are sent.

After the ideal sending rate 430, even if the sending rate is increased, the maximum buffer occupancy of the buffer of the FRM does not theoretically decrease. In particular, if the flow is bursty and many packets are received in a burst, almost all the packets of the burst will need to be buffered before they can be sent. Therefore, no matter what the sending rate greater than the ideal sending rate 430, the maximum buffer occupancy remains the same, and is at least theoretically approximately equal to the burst size (bf) (or maximum buffer occupancy 440) of the flow.

Therefore, in order to evaluate the burst size of a flow, the FP agent of some embodiments, or some other module, may send a flow through an FRM with different rates. The FP agent may determine the burst size, in some embodiments, as the minimum sending rate (i.e., ideal sending rate 430) where the maximum buffer occupancy stops changing (e.g., by a threshold, substantially, etc.) as sending rate is increased. In some embodiments, the FP agent may monitor the maximum buffer (or queue) occupancy of the FRM when handling the flow when no rate limiting is applied to the flow by the FRM for sending packets. The burst size, in some such embodiments, may then be determined to be the maximum buffer occupancy of the FRM when no rate limiting is applied to the flow for sending packets as described.

As discussed, graph 401 may be a theoretical or ideal graph. In practice, however, when the FP agent sends a flow through an FRM with different rates, the resulting graph may more closely resemble graph 402, which is similar to graph 401. Graph 402, however, unlike graph 401 does show some decrease (e.g., but below a threshold) in buffer occupancy as the sending rate is increased beyond the ideal sending rate 430. This may be due to some packets of a burst being transmitted even as the packets of the burst are being received, as in practice not all packets of a bursty flow are received at the exact same time. This way, the FP agent may generate piece-wise linear graph 402 to model the buffer occupancy for each new flow, thereby determining the burst size of the flow.

Figure 5:
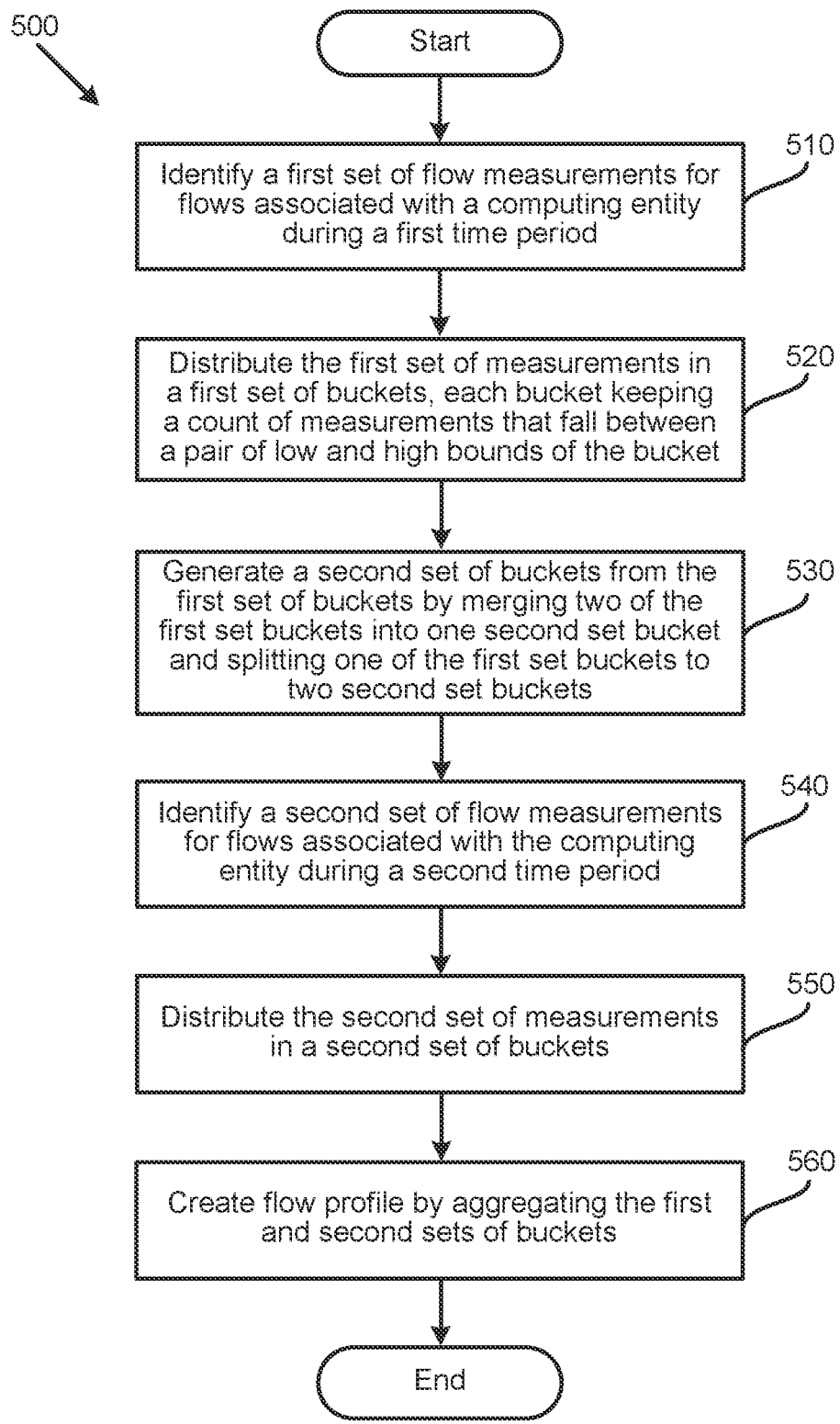
FIG. 5 is a flowchart illustrating another example process/method for determining a flow profile for a computing entity, according to an example embodiment of the present application.

FIG. 5 is a flowchart illustrating another example process/method 500 for determining a flow profile for a computing entity, according to an example embodiment of the present application. Process 500 may be performed, for example, by an FP agent, such as FPA 150, an FP manager, such as FPM 160, as described above with reference to FIG. 1, or a combination of the FP agent and FP manager. Process 500 may begin by identifying, at 510, a first set of flow measurements (or flow metrics) for the flows that are associated with a computing entity, such as a VCI or a group of VCIs, during a first time period. As described, the flow measurement values may belong to the flows that are exchanged between the computing entity and a service, and the computing entity may be a single VCI or a group of VCIs.

At 520, process 500 may distribute the first set of measurements in a first set of buckets, each bucket keeping a count of measurements that fall between a pair of low and high bounds of the bucket, as described above with reference to FIGS. 3A and 3B. Process 500 may then generate, at 530, a second set of buckets from the first set of buckets by merging two of the first set buckets into one second set bucket and splitting one of the first set buckets to two second set buckets, such that the total number of buckets in the second set of buckets stays the same as the first set. The process then identifies, at 540, a second set of flow measurements for flows associated with the computing entity during a second time period and distributes, at 550, the second set of measurements into the generated second set of buckets. Distributions of flow measurements in the first and second sets of measurements into the first and second sets of buckets are illustrated in, and described below with reference to, FIGS. 6A and 6B.

Figure 6A:
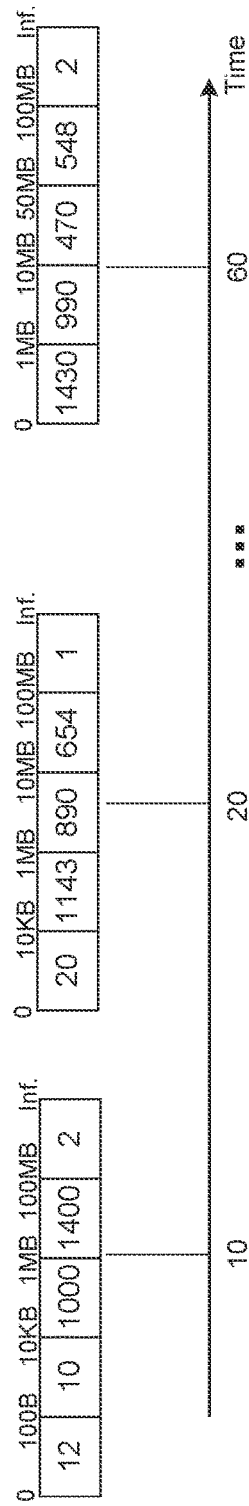
FIGS. 6A-6B illustrate using a merge and divide approach for creating different snapshots of flow data at different time intervals, according to an example embodiment of the present application.
Figure 6B:
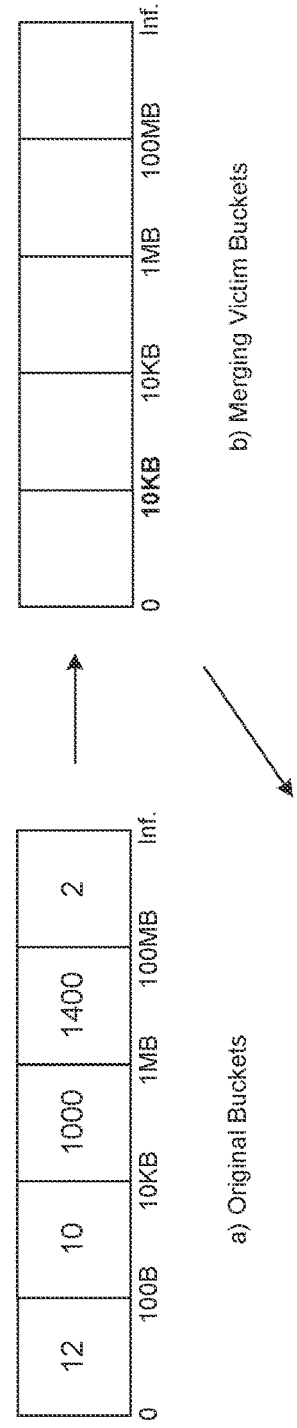

FIGS. 6A-6B illustrate using a merge and divide approach for creating different snapshots of flow data at different time intervals, according to an example embodiment of the present application. Creating the buckets with fixed upper and lower bounds may cause the counters of the flow measurement that are kept in the buckets to not reflect the distribution of flow measurement values accurately. FIG. 6A illustrates the distribution of flow measurement counts (e.g., flow size counts) in five different buckets at three different time intervals (e.g., minutes 10, 20, and 60). As shown in FIG. 6A, for the flow sizes, counters in buckets 0-100B and 100B-10 KB are very small (e.g., 12 and 10, respectively), while the counter in bucket 1 M-100 MB is very high (e.g., 1500). In some cases, it may be more valuable to zoom into the buckets that have higher counts. As such, the FP agent of some embodiments may dynamically change the bounds for the buckets in each subsequent time interval. For example, if the count in one bucket is high, the FP agent may split that bucket into multiple buckets (e.g., two buckets in the illustrated example) to capture the counts at a better resolution.

In embodiments where the number of buckets is fixed, if a bucket is to be split into two buckets, then two of the existing buckets with lower counts may be needed to be merged. As shown in FIG. 6A, the two first buckets with lower counts at interval 10 have been merged to create a single bucket that has the lower bound of the first bucket (e.g., 0) and the upper bound of the second bucket (e.g., 10 KB) in the subsequent interval 20. Similarly the fourth bucket at interval 10 having lower bound of 1 MB and upper bound of 100 MB has been divided into two adjacent buckets 1 MB-LOMB and 10 MB-100 MB in the subsequent interval 20.

In some embodiments, the FP agent may merge two adjacent buckets with lower counts. In some embodiments, the FP agent may split a candidate bucket if the counter in the candidate bucket is N times larger than the sum of the counters in the merging buckets. N, in some embodiments may be set to a particular value, such as 50, 100, etc. In some cases, if there are multiple candidate buckets to split, the FP agent may choose the bucket with the largest count. Conversely, if there are multiple buckets to merge, the FP agent of some embodiments may choose two adjacent buckets with a lowest sum of counts of measurement values.

To determine the boundaries of the buckets in each subsequent snapshot, the FP agent of some embodiments may, after merging the two adjacent buckets to a new bucket, determine the lower bound for the new bucket as the lower bound of the first of the two adjacent buckets and the upper bound of the new bucket as the upper bound of the second of the two adjacent buckets. FIG. 6B shows, in diagrams (a)-(d), how the FP agent merges and divides the buckets to create each subsequent set of buckets. Diagram (a) shows the distribution of the counts at time interval 10. In diagram (b), the FP agent may shift all the buckets between the newly generated bucket (e.g., bucket 0-10 KB) and the candidate bucket that is to be divided (e.g., bucket 1 MB-100 MB) towards the new bucket. In diagram (c), since the first two original buckets are merged into a single bucket and one bucket is left empty, the FP agent may, after shifting the buckets towards the new merged bucket, move the empty bucket adjacent to the candidate bucket that is to be divided. Finally, in diagram (d), the FP agent may split the candidate bucket into two new buckets, such that one bucket occupies the original candidate bucket, while the new bucket occupies the adjacent empty bucket.

For assigning boundaries to the two newly generated buckets, if the candidate bucket had lower and upper bounds bl, bh, then the two new buckets may have, respectively, lower and upper bounds bl, bn assigned to the first buckets, and lower and upper bounds bn, bh assigned to the second bucket. In some embodiments, the FP agent may choose bn to be a geometric mean of the lower bound of the first bucket (e.g., bl) and the upper bound of the second bucket (e.g., bh), which for the illustrated example is 10 MB.

After generating the second sets of buckets for the second snapshot associated with time interval 20 (minute), as described above, the FP agent may distribute the measurement values collected between minute 10 and minute 20 into the recently generated buckets, as shown in FIG. 6A. As shown in this figure, between minute 10 and 20, the number of collected flows that have sizes between 0-10 KB are 20, while the number of flows having sizes between 1 MB-10 MB and 10 MB-100 MB collected during the same period of time are 890 and 654 flows, respectively.

Returning to FIG. 5, at 560, process 500 may create a flow profile for the computing entity by aggregating the first and second sets of buckets. The process may then end. It should be noted that, even though only two flow measurement snapshots (including two sets of measurements and buckets associated with two different time intervals) are used in FIG. 5 to generate a flow profile for a computing entity, some embodiments, as described above, may use a different (e.g., predefined) number of flow measurement snapshots (e.g., each snapshot associated with a different time interval) to generate a flow profile for a computing entity. As an example, FIGS. 7A-7C illustrate aggregating 4 sets of buckets associated with 4 different flow snapshots to generate a flow profile for a computing entity.

Figures 7A, 7B, 7C:
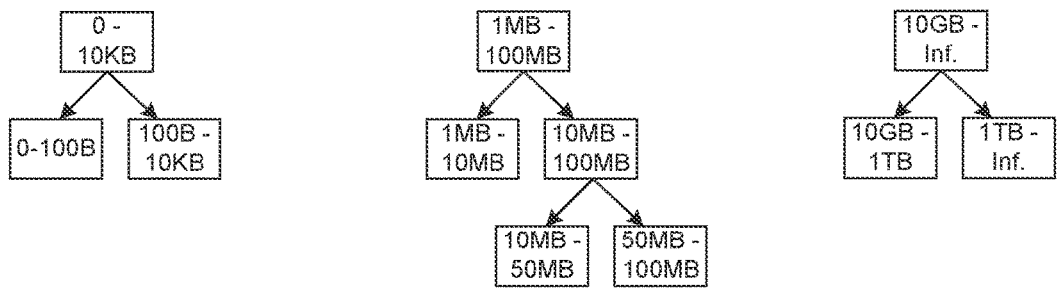
FIGS. 7A-7C illustrate creating multiple snapshots of flow data and aggregating the snapshots to create a flow profile, according to an example embodiment of the present application.

FIGS. 7A-7C illustrate creating multiple snapshots of flow data and aggregating the snapshots to create a flow profile, according to an example embodiment of the present application. More specifically, FIG. 7A shows, in four different snapshots, the distribution of flow sizes for the flows collected at four different time intervals. The boundaries of the buckets in each subsequent snapshot (e.g., snapshots 2-4) may be assigned using the same method as discussed above. FIG. 7C shows the resulting flow profile after aggregating the buckets shown in the four snapshots of FIG. 7A. FIG. 7B shows how the boundaries for the buckets in the resulting flow profile are determined.

As described above, once the snapshots for a flow profile are created, the FP agent needs to aggregate the snapshots (of the shorter durations) to build the flow profile (of the longer duration). Since the boundaries of the buckets may be different in each snapshot, the FP agent of some embodiments may create multiple tree graphs based on the candidate buckets that are divided in each snapshot, as shown in FIG. 7B, to determine the buckets and their corresponding boundaries in the aggregated flow profile of FIG. 7C. For example, in some embodiments, the buckets in the aggregated flow profile may include the bottom level leaves of each tree graph (e.g., the combination of the buckets that have not been split further), as shown in the figure.

As the individual snapshots can have buckets that contain different counts the FP agent may not be able to merely add the counts of the buckets to each other to determine the counts of the buckets in the final flow profile. As such, in some embodiments, the FP agent may add the counts proportionally based on the number of children buckets as the result of dividing the parent bucket and the count numbers in each child bucket. For example, if a parent bucket is divided into two children buckets, then the FP agent of some such embodiments may split the count in the parent bucket into the two buckets based on the counts of the children buckets. To do so, in some embodiments, the FP agent may first aggregate the counts in all the buckets from all of the snapshots that are to be merged. The FP agent may then use a map of all parent buckets that are further divided (as shown in FIG. 7B) to determine how to divide the counts proportionally. It should be noted that there may be multiple levels in a tree as a child bucket may have been further divided to more buckets (e.g., child bucket 10 MB-100 MB is further divided to two buckets 10 MB-50 MB and 50 MB-100 MB, as shown in FIG. 7B). To determine how to divide the counts, the FP agent may divide the count from each parent node into its children nodes in proportion to the counts in the children nodes. For example, if the parent node has a count of 1000, and its children have counts of 200 and 1800, then the FP agent may divide the count of the parent (i.e., 1000) into 100 and 900, and add these counts to the counts of the children respectively. As a result, the counts of the children will be 300 (200+100) and 2700 (1800+900).

In the illustrated example, the sum of counts for all the buckets of all the snapshots for the resulting bucket 0-10 KB of the flow profile (in FIG. 7C) is 293. That is, the first snapshot has a total count of 75 in the first two corresponding buckets of the first snapshot. Similarly, the corresponding counts in the remaining three snapshots are 61, 75, and 82. The sum of all these counts will be 293 for the resulting bucket 0-10 KB. However, this parent bucket, as shown in FIG. 7B is divided into two buckets 0-100B and 100B-10 KB, where the first bucket has a count of 10 while the second bucket has a count of 65. Therefore, 293, which is the sum of all buckets, needs to be divided into two buckets in proportions of 10 and 65. The result, as shown in the first two buckets of the flow profile in FIG. 7C, will be 39 and 254. That is for each one count in bucket 0-100B of the flow profile, there will be 6.5 counts in bucket 100B and 10 KB of the flow profile, which is the same proportion at which the counts are distributed in the first snapshot of FIG. 7A. The rest of the counts for the remaining buckets of the flow profile may be calculated in a similar fashion by the FP agent of some embodiments.

As described above, having a flow profile for a computing entity (e.g., a VCI, a group of VCIs implementing an application, etc.) may be helpful in making many different decision related to the computing entity, the host machine(s) that hosts the computing entity, and any change to the network topology in general. For example, having a flow profile for a VCI may help in identifying a destination host for the VCI when the VCI has to be migrated from its current host to another host.

Figure 8:
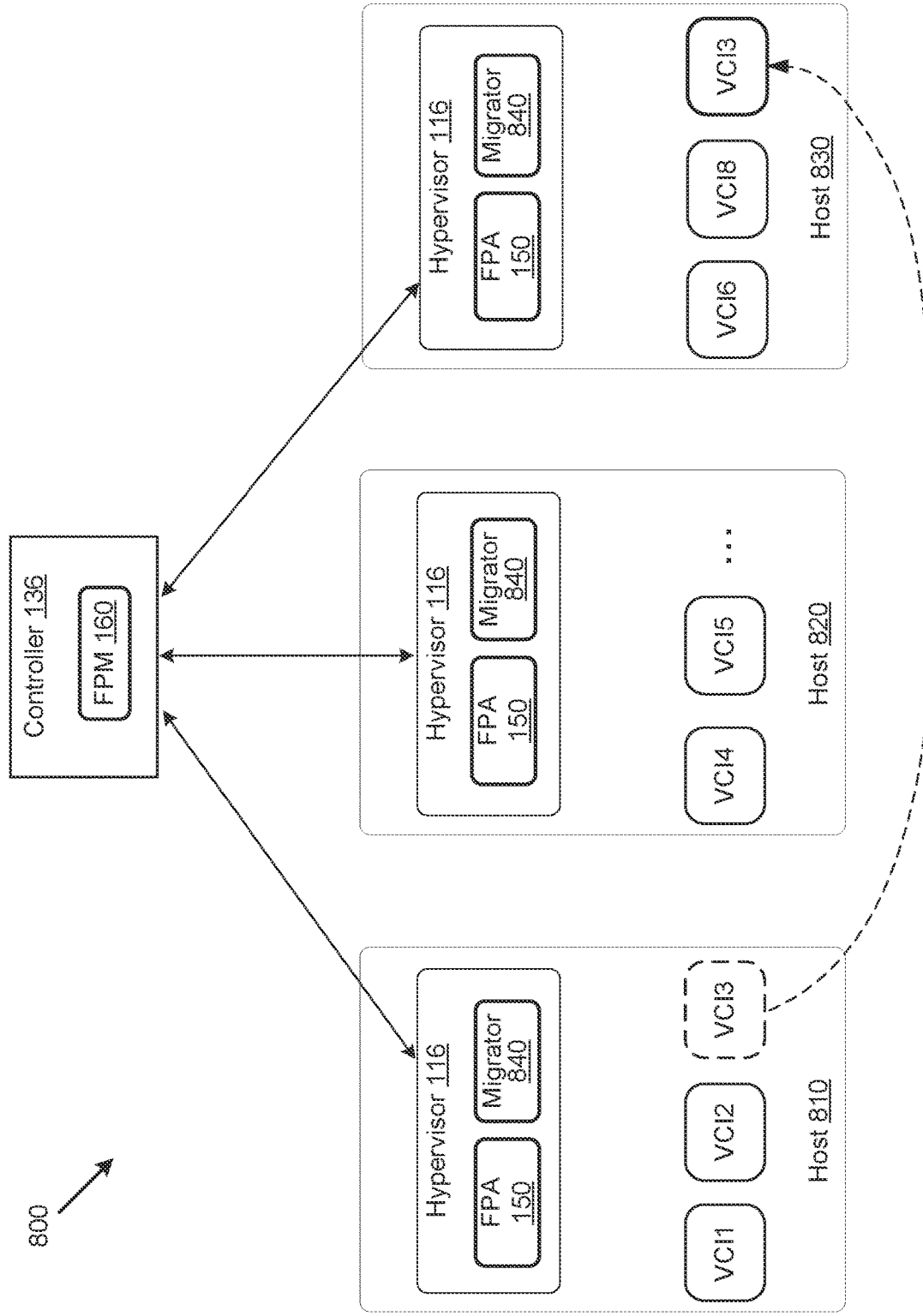
FIG. 8 includes a block diagram illustrating using a flow profile generated for a computing entity to determine a destination host machine for migrating the computing entity, according to an example embodiment of the present application.

FIG. 8 includes a block diagram 800 illustrating using a flow profile generated for a computing entity to determine a destination host machine for migrating the computing entity, according to an example embodiment of the present application. More specifically, block diagram 800 includes a controller 136 in communication with three different host machines 810, 820, and 830. As illustrated in the figure, each host machine executes a migrator 840 and an FP agent 150, among other agents/modules in its respective hypervisor. In some embodiments, migrators 840 may communicate with controller 136 or an FP manager 160 residing in the controller to coordinate the migration of a VCI from one host machine to another.

As illustrated in FIG. 8, each host machine has one or more VCIs running in the host machine. For example, VCI1-VCI3, are running in host machine 810, VCI4 and VCI5, are running in host machine 820, and VCI 6 and VCI7, are running in host machine 830. FPM 160 or each of FPAs 150 may have created a flow profile for one or more of the VCIs based on the communications of the VCIs with one or more services, as described in the above paragraphs. Additionally, based on the network traffic statistic data, controller 136 may have determined that VCI3 has to be migrated from host machine 810. As discussed above, there can be many different factors for controller 136 to determine that VCI3 has to be moved from host machine 810. As one example, based on the heavy work load of host machine 810 and potential network congestion at this host, the controller may decide to move VCI3 to another host machine.

After deciding to move VCI3, however, the controller may not know which host machine is a suitable host for the VCI. FPM 160 may help the controller to make such a decision. For example, based on the information received from FPAs 150, FPM 160 may determine that flows transmitted from VCI3 include one or more bursty flows, or that currently there are too many flows exchanged between VCI3 and a particular service. At the same time, based on the network statistics received, or maintained, by controller 136, the controller may determine that host machine 820 is very busy, while the VCIs running in host machine 830 have not created a lot of traffic for the forwarding elements of host machine 830. Based on this information, and the flow profile of VCI3, the controller may decide to migrate VCI3 to host machine 830 and avoid creating network congestion in host machine 820. The dashed line indicates that VCI3 is being migrated from host machine 810 to host machine 830, as the result of such determination made by the controller.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for migration of a flow profile of a computing entity, comprising:
    receiving, at a first host, a first flow profile of the computing entity, the first flow profile based on first one or more flow measurement values for first one or more flows exchanged between the computing entity and a service while the computing entity is running on a second host;
    receiving, at the first host, the computing entity migrated from the second host;
    utilizing, at the first host, the first flow profile to reduce a flow rate for at least one of a second one or more flows;
    identifying, at the first host, second one or more flow measurement values for the second one or more flows exchanged between the computing entity and the service while the computing entity is running on the first host; and
    updating the first flow profile based on the second one or more flow measurement values.

2. The method of claim 1, wherein the second one or more flows each comprises a set of packets transmitted between the computing entity and another computing entity.

3. The method of claim 1, further comprising:
    receiving, at the first host, a second flow profile of a second computing entity;
    configuring, at the first host, a third computing entity; and
    utilizing, at the first host, the second flow profile to control flow rate of at least one flow between the third computing entity and the service.

4. The method of claim 1, further comprising:
    obtaining the first flow profile at a controller associated with a plurality of hosts including the first host and the second host; and
    selecting, by the controller, based on the first flow profile, the first host for migration of the computing entity from the second host.

5. The method of claim 1, wherein each of the first one or more flow measurement values comprises one of a flow size, burst size of a flow, packet arrival rate of a flow, or packet arrival intervals associated with a flow.

6. The method of claim 1, wherein updating the first flow profile based on the second one or more flow measurement values comprises:
    for each of a first plurality of buckets, each of which has a lower bound value and an upper bound value, incrementing a counter of the corresponding bucket for each of the first one or more flow measurement values that is between the lower bound value and the upper bound value of the corresponding bucket;
    for each of a second plurality of buckets, incrementing a counter of the corresponding bucket for each of the second one or more flow measurement values that is between the lower bound value and the upper bound value of the corresponding bucket; and
    updating the first flow profile by aggregating the first plurality of buckets with the second plurality of buckets.

7. The method of claim 6, further comprising:
    generating the second plurality of buckets from the first plurality of buckets by:
        merging a first bucket and second bucket of the first plurality of buckets into a single bucket by: setting a lower bound value of the single bucket to the lower bound value of the first bucket and by setting an upper bound value of the single bucket to the upper bound value of the second bucket; and
        splitting a third bucket of the first plurality of buckets into a fourth bucket and a fifth bucket by: setting a lower bound value of the fourth bucket to the lower bound value of the third bucket, setting an upper bound value of the fourth bucket to a first value between the lower bound value and the upper bound value of the third bucket, setting a lower bound value of the fifth bucket to a second value between the lower bound value and the upper bound value of the third bucket, and setting an upper bound value of the fifth bucket to the upper bound value of the third bucket.

8. The method of claim 1, wherein the computing entity comprises one of a virtual computing instance (VCI), a physical computing device, or a plurality of VCIs.

9. A non-transitory computer readable medium comprising instructions that, when executed by one or more processors of a computing system, cause the computing system to perform a method for migration of a flow profile of a computing entity, the method comprising:
    receiving, at a first host, a first flow profile of the computing entity, the first flow profile based on first one or more flow measurement values for first one or more flows exchanged between the computing entity and a service while the computing entity is running on a second host;

receiving, at the first host, the computing entity migrated from the second host;

utilizing, at the first host, the first flow profile to reduce a flow rate for at least one of a second one or more flows;

identifying, at the first host, second one or more flow measurement values for the second one or more flows exchanged between the computing entity and the service while the computing entity is running on the first host; and updating the first flow profile based on the second one or more flow measurement values.

10. The non-transitory computer readable medium of claim 9, wherein each of the second one or more flows comprises a set of packets transmitted between the computing entity and another computing entity.

11. The non-transitory computer readable medium of claim 9, the method further comprising:

receiving, at the first host, a second flow profile of a second computing entity;

configuring, at the first host, a third computing entity; and utilizing, at the first host, the second flow profile to control flow rate of at least one flow between the third computing entity and the service.

12. The non-transitory computer readable medium of claim 9, the method further comprising:

obtaining the first flow profile at a controller associated with a plurality of hosts including the first host and the second host; and selecting, by the controller, based on the first flow profile, the first host for migration of the computing entity from the second host.

13. The non-transitory computer readable medium of claim 9, wherein each of the first one or more flow measurement values comprises one of a flow size, burst size of a flow, packet arrival rate of a flow, or packet arrival intervals associated with a flow.

14. The non-transitory computer readable medium of claim 9, wherein updating the first flow profile based on the second one or more flow measurement values comprises:

for each of a first plurality of buckets, each of which has a lower bound value and an upper bound value, incrementing a counter of the corresponding bucket for each of the first one or more flow measurement values that is between the lower bound value and the upper bound value of the corresponding bucket;

for each of a second plurality of buckets, incrementing a counter of the corresponding bucket for each of the second one or more flow measurement values that is between the lower bound value and the upper bound value of the corresponding bucket; and updating the first flow profile by aggregating the first plurality of buckets with the second plurality of buckets.

15. The non-transitory computer readable medium of claim 14, the method further comprising: generating the second plurality of buckets from the first plurality of buckets by:

merging a first bucket and second bucket of the first plurality of buckets into a single bucket by: setting a lower bound value of the single bucket to the lower bound value of the first bucket and by setting an upper bound value of the single bucket to the upper bound value of the second bucket; and splitting a third bucket of the first plurality of buckets into a fourth bucket and a fifth bucket by: setting a lower bound value of the fourth bucket to the lower bound value of the third bucket, setting an upper bound value of the fourth bucket to a first value between the lower bound value and the upper bound value of the third bucket, setting a lower bound value of the fifth bucket to a second value between the lower bound value and the upper bound value of the third bucket, and setting an upper bound value of the fifth bucket to the upper bound value of the third bucket.

16. The non-transitory computer readable medium of claim 9, wherein the computing entity comprises one of a virtual computing instance (VCI), a physical computing device, or a plurality of VCIs.

17. A computer system, comprising:

a memory comprising instructions; and at least one processors coupled to the memory and configured to execute the instructions and cause the computer system to perform a method for migration of a flow profile of a computing entity, the method comprising:

receiving, at a first host, a first flow profile of the computing entity, the first flow profile based on first one or more flow measurement values for first one or more flows exchanged between the computing entity and a service while the computing entity is running on a second host;

receiving, at the first host, the computing entity migrated from the second host;

utilizing, at the first host, the first flow profile to reduce a flow rate for at least one of a second one or more flows;

identifying, at the first host, second one or more flow measurement values for the second one or more flows exchanged between the computing entity and the service while the computing entity is running on the first host; and updating the first flow profile based on the second one or more flow measurement values.

18. The computer system of claim 17, wherein the second one or more flows each comprises a set of packets transmitted between the computing entity and another computing entity.

19. The computer system of claim 17, the method further comprising:

receiving, at the first host, a second flow profile of a second computing entity;

configuring, at the first host, a third computing entity; and utilizing, at the first host, the second flow profile to control flow rate of at least one flow between the third computing entity and the service.

20. The computer system of claim 17, the method further comprising:

obtaining the first flow profile at a controller associated with a plurality of hosts including the first host and the second host; and selecting, by the controller, based on the first flow profile, the first host for migration of the computing entity from the second host.

* * * * *